United States Patent [19]

Sexton

[11] 4,328,481

[45] May 4, 1982

[54] VISUAL CUING SYSTEM AND APPARATUS

[76] Inventor: William H. Sexton, 2675 Elliott Ave., Columbus, Ohio 43204

[21] Appl. No.: 152,549

[22] Filed: May 23, 1980

Related U.S. Application Data

[63] Continuation-in-part of Ser. No. 80,926, Oct. 1, 1979, abandoned.

[51] Int. Cl.$^3$ ............................................. B60Q 1/26
[52] U.S. Cl. ....................................... 340/74; 340/84; 340/321; 340/331; 340/107
[58] Field of Search ................. 340/107, 84, 97, 74, 340/321, 331

[56] References Cited

U.S. PATENT DOCUMENTS

| | | | |
|---|---|---|---|
| 2,878,462 | 3/1959 | Tralli | 340/107 |
| 2,905,925 | 9/1959 | Whiteneck | 340/84 |
| 3,432,808 | 3/1969 | Fleece | 340/84 |
| 3,493,924 | 2/1970 | Dobbins | 340/97 |
| 3,656,104 | 4/1972 | Samra | 340/97 |

FOREIGN PATENT DOCUMENTS 1381613 1/1975 United Kingdom ................ 340/97

OTHER PUBLICATIONS

Ruch, F. L., "Psychology and Life", (fifth edition) Scott, Foresman and Company, Chicago, IL, U.S.A.
"Vision and Visual Perception", edited by C. H. Graham, John Wiley and Sons, Inc., New York, NY.
"Physiology of the Eye", by F. H. Adler, C. V. Mosby Company, St. Louis, 1965.
"The Human Senses", F. A. Geldard, John Wiley & Sons, Inc., New York, NY, 1965.

Primary Examiner—Donald J. Yusko
Attorney, Agent, or Firm—Mueller and Smith

[57] ABSTRACT

A system and apparatus for visually cuing a human subject wherein an incandescent lamp or lamps (40, 41) are energizable to provide a source of visible illumination. These incandescent lamps have a predetermined rise and fall characteristic. An observation surface (12) is positioned for confronting illumination from the lamps (40, 41) including a pattern through which filtered light of a first intensity may pass, which pattern is configured for visually conveying information to the subject. The pattern is surrounded by a region (54) opaque to illumination, that region extending to a periphery (55). A peripheral surface arrangement (14, 16) is provided extending from the observation surface (12) periphery and is positioned for confronting and transmitting illumination from the lamps (40, 41) at a second intensity selected as greater than the first intensity. Lamps (40, 41) are illuminated to effect the transmission of illumination through the peripheral surface and observation surface in an intermittent fashion at a frequency selected to provide visual stimuli of predetermined temporar pause, p, to evoke a gamma effect with respect to human visual perception of the pattern.

12 Claims, 10 Drawing Figures

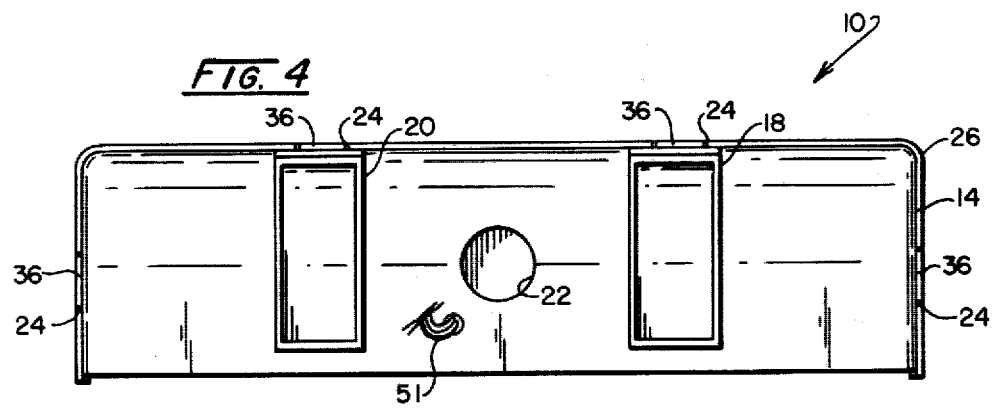
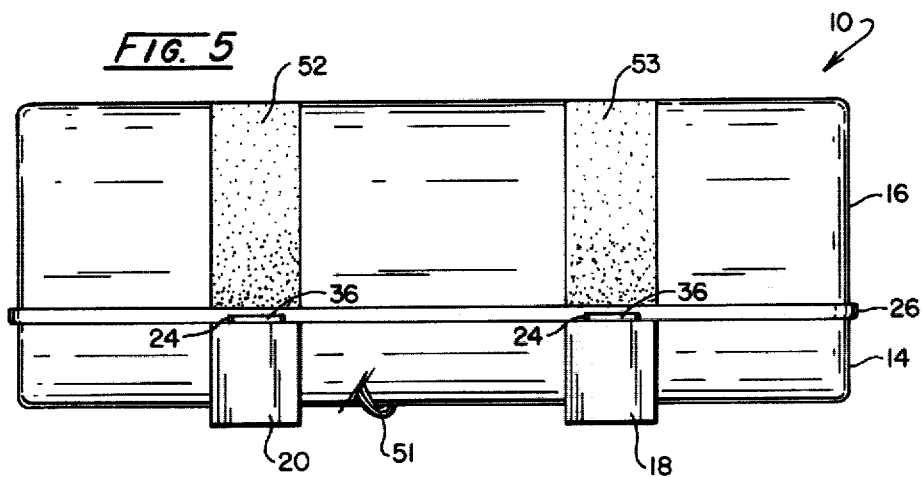
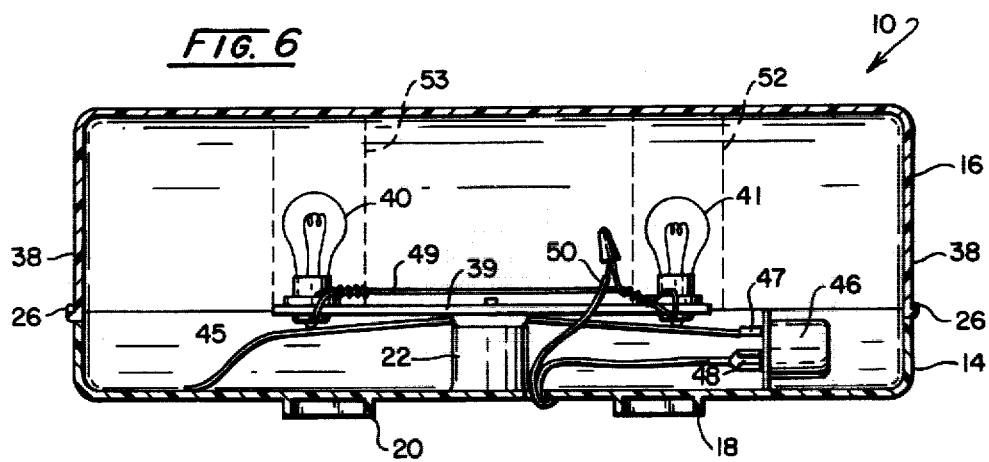

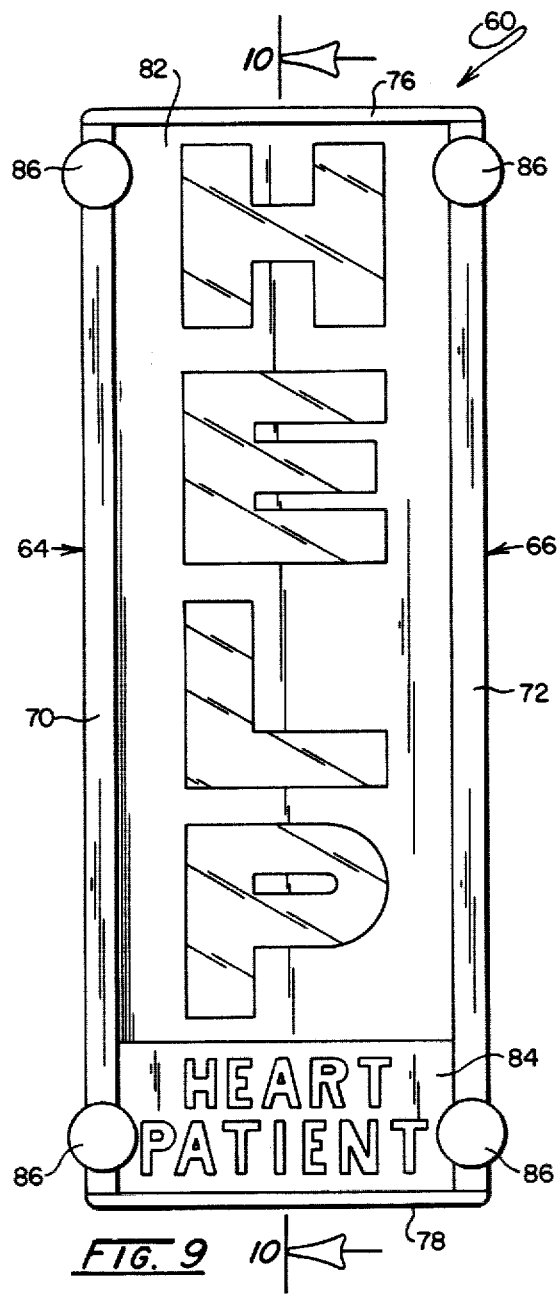
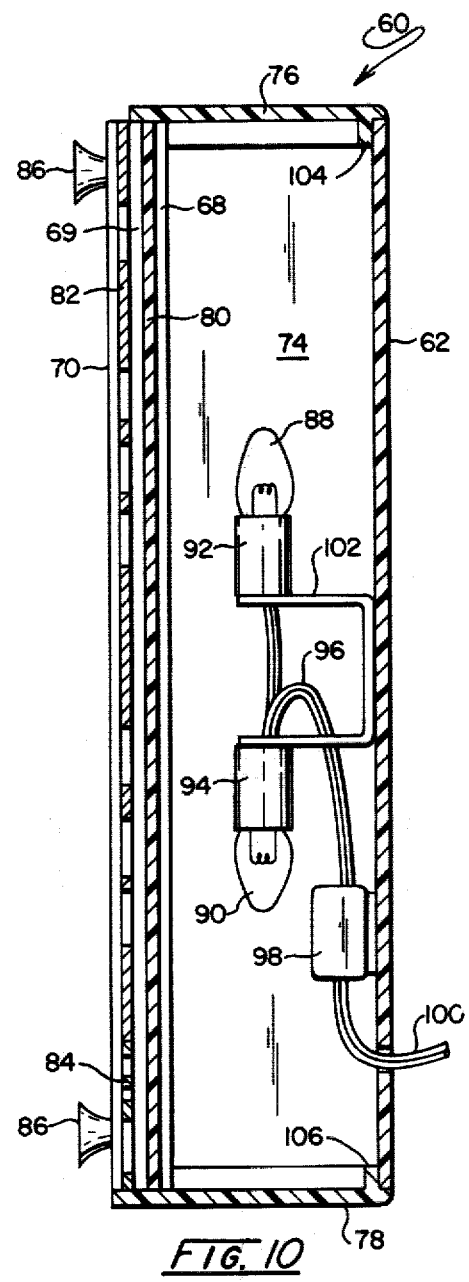

VISUAL CUING SYSTEM AND APPARATUS

RELATED APPLICATION

This application is a continuation-in-part of application Ser. No. 06/080,926, filed Oct. 1, 1979 and entitled "Visual Cuing Apparatus and Method," now abandoned.

BACKGROUND OF THE INVENTION

The highway industry and corresponding governmental entities have developed highly refined visual cues for signaling motorists in the course of driving. These devices and schemes necessarily are elaborate and correspondingly costly, the latter aspect being justified in view of the potential injury and costs associated with accidents. The need for elaborate visual cue systems stems from the extended distances traveled by vehicles during the reaction or response times of typical drivers and the stopping distances involved in braking from higher speeds. A final aspect of such visual cuing involves a need to convey information relating the type of emergency or hazard which the motorist is about to encounter. Generally, such information cues are provided as large signs or roadway illumination devices positioned in hazardous areas.

To provide the individual motorist with a distress signaling scheme, somewhat severe restrictions are involved. Such systems or arrangements must achieve a high human perceptive response utilizing devices which are low in cost and suited for high volume markets. The perceptive response utilized for such purpose is either visual or aural, and the former generally is preferred for highway utilization in view of the intensities required with sound systems.

Generally, the motorist in distress will be stopped on the side of the highway in a position somewhat close to the road, a location obviously quite hazardous. To provide such a motorist with a signaling device, that device, to be practical, must be conveniently portable and of light weight and, if powered utilizing light sources and the like, should perform with a power supply which is assured and reasonable in nature. Visual perception must be achieved by the device, i.e. it must "catch the eye" of motorists in oncoming traffic and, once that attention has been achieved, some divulgation of the type emergency at hand should be conveyed. For example, it should be apparent to the oncoming motorist that a flat tire is being changed or that immediate help is required.

Perception utilizing light devices will be aided by the height of the device above the roadway or by adequate distance from the scene of distress, i.e. it should be mountable upon the roof of the car or well rearwardly thereof. Permanent mountings at automobile roof locations, however, are impractical. If possible, the device should illuminate the immediate scene, however, devices heretofore proposed have been too elaborate to gain popular acceptance. For the most part, only intermittent lighting of the auto tail light is available on a broad basis. Such an arrangement is helpful but it does not convey the type of emergency involved. A need, therefore, is present for a device which is low in cost to the consumer and meets the three visual cue criteria described above without undue trade-offs in consequence of cost.

Visual cuing designed to gain the attention or cognition of humans has been the subject of scientific inquiry for many years. Easily achieving what is sometimes referred to as "voluntary attention" has proved to be a difficult task, particularly at reasonable cost levels. The need for such achievement extends to applications beyond those described above in connecton with automotive motor vehicles. For example, room guests in hotel corridors during fire emergencies often experience difficulty in locating stairway exits, even though illuminated signs showing stairway locations are present. Effective but lower cost visual cuing devices are required in both the commercial and recreational marine fields, as well as in conjunction with slower moving vehicles such as tractors and the like.

Another requirement for effective but low cost visual cuing has arisen in connection with public emergency services as are associated with rescue squads or fire prevention equipment. Very often, members of the public are under such conditions of anxiety in an emergency that they provide inaccurate addresses. As a consequence, some form of apprisal of the location of a distress condition with respect to a home or the like will be quite helpful. Those of the public prone to such situation, i.e. those suffering heart disease or epilepsy, will find advantage in having available a visual cue which is highly perceptible to emergency vehicles from the highway. Further, neighborhoods now provide for the designation of "Block Parents" through the use of window signs. With the arrangement, when children of the neighborhood are in immediate distress, such homes are available for prompt help. Improved signaling from such homes when a block parent actually is available will aid in the effectiveness of the system.

Generally, in providing visual cuing to achieve attention, specific influencing factors are resorted to. Some of these factors, such as change and size, are characteristics of a stimulus situation. While larger size has been found to attract attention, such factor is not included for use in connection with the design of practical cuing devices. Change, however, has been determined by investigators to attract attention. Change, as determined by these investigators is " . . . movement in any direction: from one intensity to another; from absent to present; from red to green; from high to low; from moving to stationary." See the following publication in this regard:

I. Ruch, F. L., "Psychology and Life" (Fifth edition) Scott, Foresman and Company, Chicago, Ill., U.S.A.

SUMMARY OF THE INVENTION

The present invention is addressed to a system and apparatus for providing highly effective but low cost visual curing by achieving a unique combination of change factor stimuli.

Compelling attention from the viewing subject is achieved by a unique utilization of signaling components to evoke a gamma movement phenomenon with respect to illuminated messages, thus deriving one aspect of apparent motion on the part of the viewer. Apparent successive visual stimulation also is evoked by combining an illuminated but filtered message pattern with a diffuse, soft white and less attenuated background illumination on an intermittent basis. This physiologically derives the effect of a phase difference between the illuminated message and the illumination which surrounds it.

Significantly more demand perception is achieved with the system than that derived from a mere blinking sign.

As another feature and object of the invention, a system for visually cuing a human subject is provided which includes one or more lamps which are energizable to provide a source of visible illumination and which has a predetermined rise and fall characteristic with respect to the corresponding energization and deenergization thereof. An observation surface is positioned for confronting illumination from the lamp and that surface includes a pattern through which light of first intensity may pass, the pattern being configured for visually conveying information to the subject and being surrounded by a region opaque to the illumination such region extending to a periphery which may, for example, be parallel to and adjacent the edges of a rectangular faceplate. A peripheral surface arrangement then is provided which extends from the observation surface periphery and is positioned for confronting and transmitting illumination from the lamp at a second intensity which is selected as greater than the first intensity. Additionally, an arrangement such as an oscillator or the like is provided for energizing the lamp to effect the transmission of illumination through the peripheral surface and, simultaneously, through the pattern in intermittent fashion at a frequency selected to provide visual stimuli of predetermined temporal pause, p, to evoke a gamma effect with respect to human visual perception of the pattern.

Another feature of the invention provides a temporal pause, p, as selected between about 80 and 400 msec. Generally, a frequency of intermittency is selected as about two cycles per second.

As another feature and object of the invention, the observation surface pattern as aboved described is present as a pigmented, light transmissive material, while the peripheral surface is present as a translucent material effective to diffuse the illumination transmitted therethrough. In a preferred arrangement, a soft white light surround is provided.

Another object of the invention is to provide an observation surface as above described wherein the light transmissive material thereof is pigmented in a color selected from the yellow to red regions of the spectrum of light. Further, the lamp is provided as an incandescent one having a rise and fall characteristic which is selected for evoking the noted gamma effect.

Another object of the invention is to provide apparatus for visually cuing a human subject which includes a first elongate housing formed of light diffusing material and having a given peripheral edge, the housing including an integrally formed first open channel extending along a forwardly disposed portion of the periphery thereof, one surface of that first housing supporting a pedestal at a position spaced from the first open channel. A lamp bracket is connected with the noted pedestal which includes at least one lamp socket opening formed therein. An incandescent lamp is removably insertable within the lamp socket opening which is provided having a predetermined rise and fall characteristic. An intermitting circuit is electrically connectable with the lamp at the socket opening which is energizable from a source to intermittently energize the lamp at a predetermined frequency. An elongate, rectangular faceplate having oppositely disposed parallel edges, a first portion of which are removably insertable for support within the first housing open channel is provided. The faceplate is formed of a selectively pigmented light transmissive, filtering material and includes an opaque mask adjacent a surface thereof within which are openings which define a pattern through which light may pass at a first intensity. This pattern is configured for visually conveying information to the subject viewing the apparatus. A second elongate housing formed of light diffusing material and having a peripheral edge portion corresponding to and removably connected with the first housing given peripheral edges is provided. The second housing additionally includes an integrally formed second open channel extending along a forwardly disposed portion of the periphery thereof which supportively slidably is disposed over a second portion of the faceplate edges when the second housing is connected to the first housing. The first and second housings combine to enclose the lamp, the lamp bracket and pedestal.

Another object of the invention is to provide apparatus as above described wherein the surface of the second housing is configured having a region of light scattering lenticulations at regions thereof adjacent to the lamp to improve the diffusion of light emanating therefrom.

Another aspect and object of the invention provides apparatus as above disclosed wherein one surface of the faceplate is configured as an integrally formed array of discreet lenticulations having an internal reflecting characteristic.

As another object of the invention, the intermitting circuit of the above-described apparatus includes an oscillator which is packaged within a rigid container having an output terminal and which is positioned on the first housing interior surface adjacent the lamp bracket. A resilient conductive strap is provided having one end coupled to the terminal and which extends beneath and slidably supported by the bracket. Simple fabrication of the apparatus is provided by utilizing the container as one support for this strap, while the opposite end of it is bent downwardly to be urged upwardly by the interior surface of the first housing.

As another object of the invention, the forwardly disposed portions of the peripheries of the first and second housings of the apparatus above described are provided such that they extend forwardly over the edges of the faceplate.

As another object and feature of the invention, an elongate cord along with an electrical connector configured insertion in the cigar lighter of a vehicle is provided such that the apparatus readily is utilized in vehicular situations.

Another feature and object of the invention resides in the utilization of the backlighting of the apparatus to illuminate the region of a distress scene. Thus, subjects approaching such scene are apprised of the presence of a distress condition as well as the physical factors involved in that distress condition. This is accomplished with apparatus of very low cost.

As another object, the invention provides a portable signaling apparatus for use in the home of a type described wherein various forms of indicia may be provided to apprise emergency vehicles of the emergency at hand. For example, the apparatus may provide both an illuminated word correlative with an emergency condition and a second word descriptive of that emergency condition, for example, the word, "HELP" combined with the words, "HEART PATIENT." Similarly, "BLOCK PARENT" may be utilized with the apparatus.

Other objects of the invention will, in part, be obvious and will, in part, appear hereinafter.

The invention, accordingly, comprises the system and apparatus possessing the construction, combination of elements and arrangement of parts which are exemplified by the following disclosure.

For a fuller understanding of the nature of objects of the invention, reference should be had to the following detailed description taken in conjunction with the accompanying drawings.

BRIEF DESCRIPTION OF THE DRAWINGS

FIG. 4 is a bottom view of the apparatus of FIG. 1;

FIG. 5 is a rear view of the apparatus of FIG. 1;

FIG. 6 is a sectional view taken through the plane 6—6 shown in FIG. 3;

FIG. 9 is a front view of another embodiment for apparatus according to the invention; and FIG. 10 is a sectional view of the apparatus of FIG. 9 taken through the plane 10—10 represented therein.

DETAILED DESCRIPTION

In the discourse to follow, a description is given of a signaling apparatus which embodies the unique attributes of the visual cuing system of the invention. Following a description of the apparatus per se, its operation in conjunction with the system is described. Finally, a second embodiment of apparatus according to the invention is described.

Figure 1:
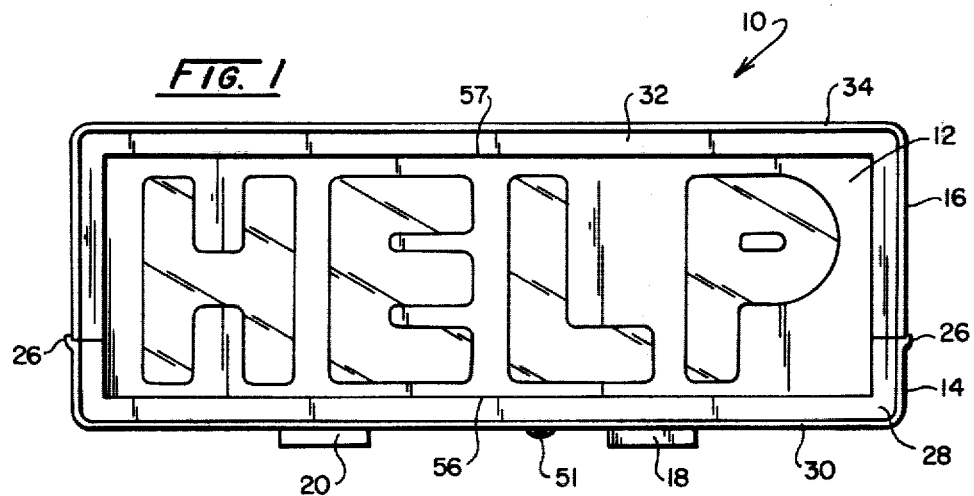
FIG. 1 is a front view of apparatus according to the invention.
Figure 2:
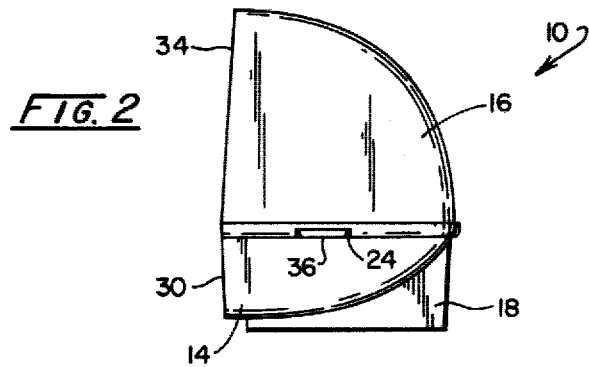
FIG. 2 is a side view of the apparatus of FIG. 1.
Figure 3:
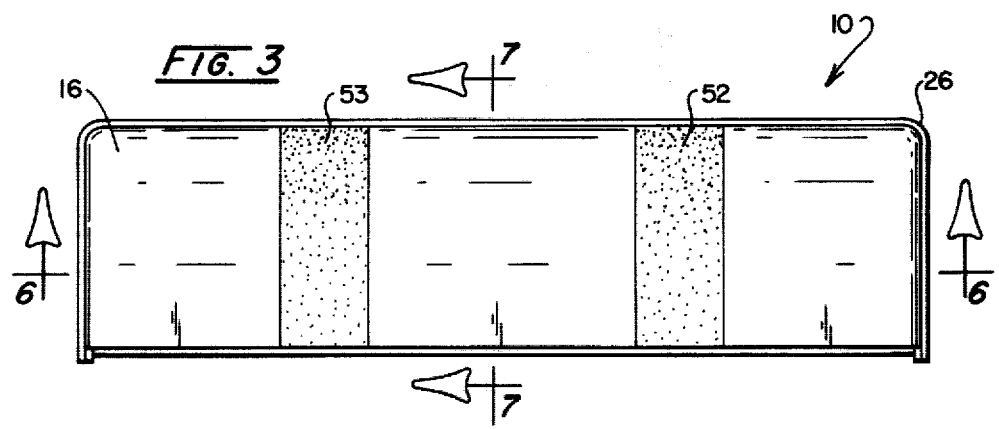
FIG. 3 is a top view of the apparatus of FIG. 1.
Figure 7:
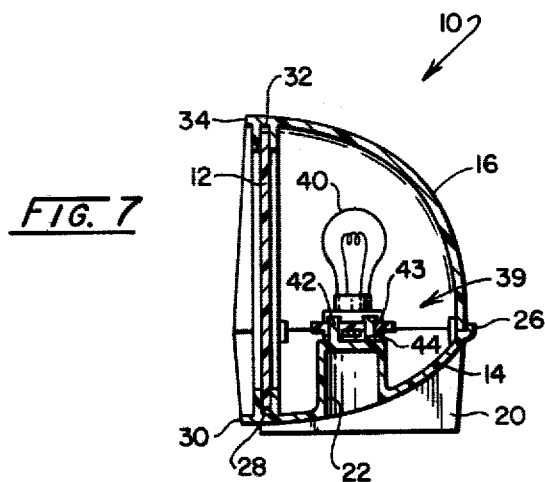
FIG. 7 is a sectional view taken through the plane 7—7 shown in FIG. 3.

Referring to FIG. 1, the apparatus of the invention in the form of a device 10 suited for use as a distress signal for vehicles such as automobiles or boats is revealed. Device 10 includes an observation surface or faceplate 12 which, as shown additionally in FIG. 7, is mounted and supported by two polymeric housings 14 and 16. Housings 14 and 16 are formed of a translucent polymer and serve as a peripheral surface which extends from the observation surface or faceplate 12 and which transmit light outwardly about the periphery of faceplate 12. Housing 14 is injection molded and, as is revealed additionally in FIGS. 2, 4, 5 and 7, comprises an integrally formed rounded body portion having integrally molded spaced leg components 18 and 20 extending downwardly therefrom. Intermediate leg components 18 and 20 is an inwardly protruding and integrally molded pedestal 22 which, as shown in FIGS. 6 and 7, extends upwardly at a position spaced from faceplate 12. Female connector slots 24 are positioned within an upwardly facing rim 26 to provide for connection between housings 14 and 16. The profile of rim 26 is revealed in FIGS. 1 and 6. Looking to FIG. 7, the forward portion of housing 14 is shown to be formed having an upwardly facing open channel 28 which is dimensioned to receive the bottom edge portion and portions of the side edges of faceplate 12. The figure also reveals that the polymeric material forming housing 14 extends forwardly of channel 28 as at 30 such that, in effect, it fully surrounds the observation surface at faceplate 12. The figure further reveals that housing 16 is formed having a generally curved elongate structure the lower periphery of which is configured to nest within rim 26 and the forwardmost portion of which also is formed having a downwardly facing open channel 32. Similar to housing 14, housing 16 also is shown extending beyond channel 32 to form a forwardly disposed portion 34.

As is apparent from FIGS. 1, 2, 6 and 7, housing 16 slides downwardly over faceplate 12 until the lowermost peripheral edge thereof makes contact with rim 26. The housing is configured having outwardly extending male connector tabs 36 which "snap" into connection with the corresponding connector slots 24 of housing 14. To remove housing 16 from housing 14, for example, to change faceplate 12, the user merely depresses the sidewall portions 38 (FIG. 6) to effect simple disconnection of tabs 36 from slots 24.

The design of device 10 is arranged to permit the assembly thereof at low labor cost. Looking to FIG. 6, pedestal 22 is shown extending upwardly from the bottom of housing 14 whereupon it is connected to a lamp bracket shown generally at 39. Bracket 39 has two spaced apertures therein (not shown) which serve to retain lamps 40 and 41. As shown in FIG. 7, connection of bracket 39 to pedestal 22 is by two upstanding rods 42 and 43 which extend through bracket 39. Additionally, bracket 39 is configured so as to define a slotway 44. This slot aligns and retains an electrically conductive strap 45 which is shown in FIG. 6 to be resiliently spring biased against the positive terminals of lamps 40 and 41. Also positioned upon the inner surface of housing 14 is a intermitting device 46 having blade terminals 47 and 48. Device 46 provides a select oscillatory energization of lamps 40 and 41 and may, for example, be present as a model 552 heavy duty flasher marketed by Parker Automotive, a division of Ideal Corporation. Preferably, the oscillations provided by the containerized device 46 will be about two cycles per second. Note that conductive strap 45 is supported at terminal 47 for resilient connection with the positive terminal of lamp 41 and is bent to rest against the upwardly facing floor of housing 14 to provide suitable contact for the corresponding positive terminal of lamp 40. A ground wire 49 is connected between the two apertures through which lamps 40 and 41 are connected and in common with a lead 50 to complete the circuit. An elongate cord extends from device 10 for deriving power, for example, from a connector which is insertable within a vehicular cigar lighter receptacle. A portion of this cord is shown at 51.

The material selected for housings 14 and 16 is one which is readily molded, for example, by injection molding techniques, and which provides a translucence such that upon the energization of bulbs 40 and 41, an aurora-like diffuse white light is generated surrounding faceplate 12. Generally, a high density polyethylene may be utilized which, for example, may incorporate some white pigmentation ($TiO_2$). For the embodiment shown, lamps 40 and 41 should exhibit a relatively slow rise and fall characteristic which, for example, may be provided by bulbs utilized as taillights in the automotive industry such as a type 1156. To enhance the diffuse quality of the light emanating from housings 14 and 16 in the vicinity of lamps 40 and 41, the mold forming housing 16 is treated to provide two regions of roughened texture 52 and 53 which serve as regions of light scattering lenticulations in the immediate vicinity of the lamps. Without such regions, the light is less diffuse in the vicinity of lamps 40 and 41, a bright spot being otherwise observable.

Figure 8:
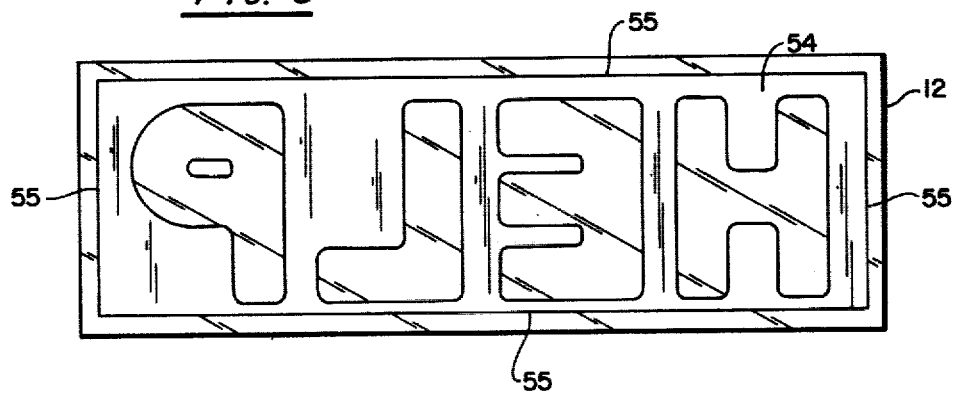
FIG. 8 is a rear view of a faceplate or observation surface utilized in the apparatus of FIGS. 1 and 2.

Looking in detail to the observation surface or faceplate 12, reference is made to FIGS. 1 and 8, the latter figure representing an interior view of the component. As is apparent, component 12 is of an elongate rectangular shape, the lowermost edge portions thereof fitting into the open channel 28 of housing 14. When housing 16 is assembled upon housing 14, the channel 32 thereof slides over the remaining portions of the edge of faceplate 12 until reaching its position of connection with housing 14. Thus, a variety of plates 12 may be inserted. Component 12 is formed of a pigmented light transmissive and thus filtering material, for example, a red acrylic plastic, type 2283 as marketed by Rohm and Haas Corporation. The material is generally translucent in nature and transmits light from lamps 40 and 41 at an intensity lower than the transmission thereof through the material forming housings 14 and 16. As shown in FIG. 8, the rearward face of faceplate 12 is selectively masked at 54 by an opaque material. Conventional screen printing in is acceptable for this masking purpose in the interest of producing the device 10 at low cost. To aid in developing rearwardly directed light reflection, however, the mask also may be provided with a specular or white reflective surface to enhance the transmission of light through housing 14 and 16. Mask 54 is configured to define a pattern for visually conveying information which is shown in the instant embodiment as the word "HELP." Accordingly, with the energization on an intermittent basis of lamps 40 and 41, light is transmitted through this pattern to be observed as a visual cue. FIG. 8 particularly reveals that mask 54 extends to a fixed periphery 55 which, generally corresponds with the inwardly depending edges 56 and 57 of respective channels 28 and 32 (see FIG. 1). This fixed periphery will be seen to be important with respect to the visual cuing system of the invention. Other indicia or patterns for component 12 may be utilized, for example, the words "SOS," "CAUTION," "OUT OF GAS," or "FLAT TIRE." As an alternate embodiment with respect to materials, the component 12 also may be fabricated having an array of prismatic lenticules formed on one side thereof, such lenticules typically being provided in conventional automotive tail lights. The pigmentation utilized for component 12 preferably will be selected from within the yellow to red region of the visible light spectrum.

Looking now to the system by which device 10 operates to gain the attention of human subjects, in its general operation, the device is plugged in, for example, through its elongate cord 51 to the cigar lighter receptacle of an automobile in distress. This causes the oscillatory illumination of lamps 40 and 41. As the lamps 40 and 41 are energized at a frequency of about two cycles per second, light passes through the walls of housings 14 and 16 to define a region of diffuse white light surrounding faceplate 12. The characteristic of this light turning on and turning off with the oscillatory energization also is affected by the noted slow rise and fall characteristics of the incandescent lamps. Simultaneously with the pasage of light through housings 14 and 16, light additionally passes through faceplate or observation surface 12 and the pattern formed therein. In effect, the diffuse white light surrounds the filtered red light passing through the "HELP" pattern. The latter light, because of the filtering of the pigment, is of a lower intensity than the light passing through housings 14 and 16. For automotive or boating applications, the device may be positioned such that the diffuse white light illuminates the scene of distress on the intermittent basis such that approaching human subjects will be apprised of the physical situation at hand. Such apprisal will be with a white light of a diffuse character, which light is unique for vehicular application, intense beams of light being utilized for such environments conventionally.

The intermittent energization of lamps 40 and 41 provides a "change" as described in connection with publication I above which provides a threshold technique for gaining attention of a human subject. However, the mere flashing of a light, without more, does not represent adequate cuing. The instant system provides other forms of "change," one such change being in the form of "apparent movement." "Apparent movement" may be achieved under conditions wherein a given stimulus (an illuminated area) is presented to a subject for a predetermined duration. A second stimulus, similar to or different from the first, then follows after a pause, p, and that second stimulus may take place at a new location. The length of the pause, p, may be varied as well as the duration, $t_1$, of the first stimulus, the duration, $t_2$, of the second stimulus, the luminences, $L_1$ and $L_2$, of the respective stimuli, or the spatial interval, s, between the two stimuli, the shapes and sizes of the two stimuli, the wavelength distributions of the two stimuli, and the conditions of instruction. Studies in the phenomenon evolved a series of experiments by Korte which led to "Korte's laws." These laws utilize the above-identified parameters, the term, p, being referred to as the "temporal pause between stimuli." Different kinds of movements have been studied and, generally, these have been identified as alpha, beta, gamma and delta movements. Of these movements, gamma movement is the apparent expansion and contraction of an object as luminence is increased or deceased. It is possible that gamma movement may be due, in some cases at least, to an increase and decrease in either defraction-pattern luminences or scattered light beyond the boundaries of the object.

Studies by Neuhaus developed, inter alia, that for certain values of t and s, optimal movement may be reported for temporal pause, p, over a range of 80 to 400 msec.

For more detailed discourse concerning the above, the reader's attention is directed to the following publication:

II. "Vision and Visual Perception," edited by C. H. Graham, John Wiley & Sons, Inc., New York.

To achieve proper operation, the intermitting energization of bulbs 40 and 41 should be at a frequency selected to provide visual stimuli of predetermined temporal pause, p, to evoke a gamma effect with respect to human visual perception of the pattern within observation surface 12. As indicated above, this temporal pause, p, should be selected between about 80 and 40 msec. The selected frequency of about two cycles per second falls within this range. As indicated earlier herein, the mask 54 perimeter 55, operating in concert with the light emanating from forward portions 30 and 34 of respective housings 14 and 16, as well as the forward surfaces 56 and 57 of the open channels, provides a line of reference about the illuminated pattern within surface 12. Thus, the observer of the device experiences a gamma effect type apparent movement of, for example, the indicia, "HELP." The letters appear to expand and contract in concert with the frequency of energization of lamps 40 and 41.

Another specific reason for the gamma phenomenon evoked from device 10 may be determined in terms of the irradiation of light, e.g., the brighter the light the more the spread over the visual receptive surface (the retina) of the eye. Thus, as the slow rise and fall times of bulbs 40 and 41 occur, a progressive increase and decrease in brightness is achieved. What is described in scientific studies of visual acuity as a "diffusion effect" is developed by the combination of the pigmented indicia of the pattern with the white diffuse surround developed from transmission of light through housings 14 and 16. This is a classic effect which sometimes is demonstrated through the use of a small white square positioned within a larger black one juxtaposed to a similarly larger white square within which is positioned a dark square of size equal to the small white one. The small white square will appear larger than the small black one although both are actually the same size. The spread of light by irradiation is partly responsible for the apparent difference in size between the equally large white and black objects. Thus, the image of the small white square spreads out by irradiation on the surrounding cones in the retina and, therefore, involves a larger area of the retina than its actual visual angle. For the same reason, the white area around the small black square causes a similar spread of illumination inward and leaves a smaller area of the retina unstimulated than that measured by the visual angle of the small black square. Hence the small black square appears, in the classic demonstration, to be smaller than the small white one. For further discussion of the diffusion effect, attention is made to the following publication:

III. "Physiology of the Eye," by F. H. Adler, C. V. Mosby, Co., St. Louis, 1965.

In view of the above, with the operation of device 10, the white surround evoked from housings 14 and 16 during the energization and deenergization of incandescent bulbs 40 and 41, appears to expand and "constrict" around the pattern (HELP) with increases in brightness and appears to "release" the pattern with decreases in brightness. In view of the above, device 10 has, inter alia, the following effects upon the viewer:

1. The letters of the pattern or message appear to expand in size as the brightness of bulbs 40 and 41 increases during their rise time and the same pattern appears to diminish in size as lamps 40 and 41 experience a diminution in brightness during their fall time characteristic.

2. The white surround achieved by illuminating housings 14 and 16 appears to expand and "constrict" as around the pattern with increases in brightness and "release" the letters with decreases in brightness.

3. The combination of the two effects above evoke a pulsating effect by device 10.

Still another stimulus effect is achieved with the system of the invention. As observed above, the soft, diffuse background and peripheral illumination developed through housings 14 and 16 is less attenuated and thus, brighter or more intense than the pigmented or filtered pattern of letters within faceplate or observation surface 12. As such, the physiological rise and fall times of the white surround are faster than the corresponding physiological rise and fall times of the pigmented illumination passing through the pattern of letters. This gives the effect of a phase difference between the diffuse surround illumination and the pattern letters to increase the "activity" of the phenomenon via apparent successive stimulation. Further, the combination gives the effect that the white diffuse background is seen or "comes on" first to attract attention to the general areas of device 10 and the slower pattern of letters then appears to give the specific message desired. Additionally, the pattern or message has a longer fall time making it appear to persist or linger in view beyond the diminishment of the background illumination. This is similar to what has been described as the Brucke effect, and for a more detailed discourse concerning it, attention is made to the following publication:

IV. "The Human Senses," F. A. Geldard, John Wiley & Sons, Inc., New York, 1965.

From the foregoing it may be seen that while simple, the device 10 incorporates all of the aspects of a quite unique visual cuing system. Additionally, where used in distress conditions, as noted above, the scene itself will be illuminated with a form of light different from that generally encountered, for example, in marine or highway applications to provide still more visual cuing to the operators of oncoming vehicles.

As indicated earlier herein, the system of the invention may be used in homes or the like for the purpose of providing some form of emergency visual cuing. The embodiment of FIGS. 9 and 10 shows such an implementation of the system.

Turning to FIGS. 9 and 10, another embodiment of the portable signaling device of the invention is revealed generally at 60. The embodiment shown is one utilized in the home for purposes of apprising emergency vehicles of the location of a distress condition such as a heart attack, epileptic seizure or such important information as the presence of a block parent. Device 60 is structured to be positioned in a somewhat vertical orientation, inasmuch as its utilization is in conjunction with the roadway facing window of a home or similar establishment. A housing member is provided which may be extruded, and the rear wall thereof is shown at 62 in FIG. 9. This housing member extends to forward facing edge structures 64 and 66 which are configured to form channels having three channel walls which, as shown in FIG. 10 for forward edge 64, are represented at 68–70. The outwardmost channel wall corresponding with forward edge 66 is shown in FIG. 9 at 72. The housing member provided by device 60 preferably is extruded to provide side and rear walls, and the cavity defined thereby, as at 74, is enclosed at the top and bottom of the device by top and bottom walls 76 and 78. Note that bottom wall 78 extends outwardly to outer channel walls 70 and 72 while top wall 76 extends only to second channel wall 69 of channel configuration 64.

A light transmitting (translucent) polymeric faceplate of elongate rectangular configuration as at 80 is retained within the groove defined, for example, between channel walls 68 and 69. This material, as before, preferably is present as a red pigmented material, for example, a type 2283 red acrylic polymer. For the embodiment shown, the distress signal indicia are changeable and are provided within a rectangular insert 82 which may be formed of a light opaque material such as cardboard or the like within which openings are formed to define the desired distress word, for example, "HELP," as illustrated. A second mask or insert also is provided at 84 which carries letters combined to form a word descriptive of the emergency condition involved. For example, as shown, the openings within the cardboard or plastic mask or insert 84 may spell the words "HEART PATIENT," "DIABETIC," "EPILEPTIC" or the like. The masks 82 and 84 are retained within units 60 in consequence of the general vertical orientation thereof combined with the extension of bottom wall 78 upon which lowermost mask 84 rests. To retain the signaling device 60 at an appropriate window, flexible polymeric suction surface contact devices as at 86 may be fixed to surfaces 70 and 72.

Illumination for devices 60 is provided by two a.c. types lamps 88 and 90 which are shown coupled within conventional sockets shown respectively at 92 and 94. Electrical connection between sockets 92 and 94 is provided by electrical leads as at 96 which extend to an intermitting device providing a flashing effect and represented at 98. From intermitter 93, an elongate flexible cord 100 extends to a conventional outlet. Lamp sockets 92 and 94 are shown mounted upon a bracket 102 which, in turn, is cemented or suitably fixed to rear wall 62. Preferably, top and bottom walls 76 and 78 are cemented into contact with the extruded components including rear wall 62, these components being shown having inwardly extending flange portions revealed respectively at 104 and 106. Other window connecting arrangements will occur to those skilled in the art. The embodiment of FIGS. 9 and 10 will be found quite helpful for situations wherein, under emergency conditions, accurate addresses are not always given to municipal emergency personnel. Of course, where the designation "BLOCK PARENT" is provided, children in distress will find location of help much easier than with conventional sign devices. The fact that the device is intermittently illuminated also will provide immediate indication that the block parent is available and in the house from which the signal is operating. As before, the aurora effect in signaling also is achieved with the instant embodiment.

Since certain changes may be made in the above apparatus and system without departing from the scope of the invention herein involved, it is intended that all matter contained in the above description or shown in the accompanying drawings shall be interpreted as illustrative and not in a limiting sense.

I claim:

1. Apparatus for visually cuing a human subject, comprising:
    lamp means energizable to provide a source of visible illumination and having a predetermined rise and fall characteristic with respect to the corresponding energization and deenergization thereof;
    observation surface means positioned for confronting illumination from said lamp means, including a surface portion of pigmented light transmissive material defining a pattern through which light of first intensity may pass and configured for visually conveying information to said subject, said pattern being surrounded by a region opaque to said illumination, said region extending to a periphery;
    peripheral surface means extending from said observation surface means periphery to substantially enclose said lamp means and positioned for confronting and transmitting illumination from said lamp means, said surface means being present as a translucent material effective to diffuse said illumination impinging thereon and transmit it at a second intensity selected as greater than said first intensity; and
    means for energizing said lamp means to effect the said transmission of illumination through said peripheral surface means and, simultaneously, through said pattern in intermittent fashion at a frequency of about two cycles per second, whereby a visual stimuli of predetermined temporal pause, p, having a value between about 80 and 400 msec. evoking a gamma movement effect with respect to human visual perception of said pattern is achieved.

2. The apparatus of claim 1 in which said observation surface means light transmissive material is pigmented in a color selected from the yellow to red regions of the spectrum of light.

3. The system of claim 2 in which said peripheral surface means is present as a white translucent material.

4. The apparatus of claim 3 in which said lamp means is present as an incandescent lamp having a said rise and fall characteristic equivalent to type 1156.

5. Apparatus for visually cuing a human subject, comprising:
    a first elongate housing formed of light diffusing material and given peripheral edge, and including an integrally formed first open channel extending along a forwardly disposed portion of the periphery thereof, one surface of said first housing supporting a pedestal at a position spaced from said first open channel;
    lamp bracket means connected with said pedestal and having at least one lamp socket opening formed therein;
    an incandescent lamp removably insertable within said lamp socket opening and having a predetermined rise and fall characteristic;
    an elongate rectangular faceplate having oppositely disposed parallel edges, a first portion of which is removably insertable for support within said first housing open channel, said faceplate being formed of selectively pigmented light transmissive filtering material and including an opaque mask adjacent a surface thereof within which are openings defining a pattern through which light may pass at a first intensity, said pattern being configured for visually conveying information to said subject;
    a second elongate housing formed of light diffusing material, having a peripheral edge portion corresponding to and removably connectable with said first housing given peripheral edge and including an integrally formed second open channel extending along a forwardly disposed portion of the periphery thereof, supportively slidably disposed over a second portion of said faceplate edges when connected to said first housing, said first and second housings enclosing said lamp, lamp bracket means and pedestal, said light diffusing material of said first and second housings transmitting diffuse light from said lamp at a second intensity greater than said first intensity; and
    intermitting circuit means electrically connectable with said lamp at said socket opening, energizable from a source to intermittently energize said lamp at a frequency of about two cycles per second to effect the intermittent transmission of illumination through said pigmented light transmissive filtering material and, simultaneously, through said first and second housings, whereby a visual stimuli of predetermind temporal pause, p, having a value between about 80 and 400 msec. evoking a gamma movement effect with respect to human visual perception of said pattern is achieved.

6. The apparatus of claim 5 wherein the surface of said second housing is configured having a region of light scattering lenticulations at regions thereof adjacent said lamp.

7. The apparatus of claim 5 in which said faceplate pigmentation is selected from the yellow to red regions of the spectrum of light.

8. The apparatus of claim 7 in which said first and second housing diffusing material is a white translucent polymer.

9. The apparatus of claim 7 in which one surface of said faceplate is configured as an integrally formed array of discrete lenticulations.

10. The apparatus of claim 5 in which said intermitting circuit means includes:

an oscillator packaged within a rigid container having an output terminal and positioned upon said first housing adjacent said lamp bracket means;

a resilient conductive strap having one end coupled to said terminal, extending beneath and slidably supported by said bracket means, and urged upwardly against a terminal of said lamp by said container and a surface of said first housing.

11. The apparatus of claim 10 wherein said intermitting circuit means includes:

an electrical connector configured for insertion in power deriving fashion within a vehicular cigar lighter receptical; and an elongate electrical cord coupled between said connector and said oscillator within said first housing.

12. The apparatus of claim 5 in which said forwardly disposed portions of the peripheries of said first and second housings extend forwardly over the said edges of said faceplate.

* * * * *